3,406,153
PROCESS OF PRODUCING POLYETHYLENE
TEREPHTHALATE
Edwin E. Eaton, Circleville, Ohio, and James R. Small, Mount Vernon, Ind., assignors to E. I. du Pont de Nemours and Company, Wilmington, Del., a corporation of Delaware
No Drawing. Continuation-in-part of application Ser. No. 274,903, Apr. 23, 1963, which is a continuation-in-part of application Ser. No. 195,325, May 16, 1962. This application Aug. 9, 1966, Ser. No. 571,179
4 Claims. (Cl. 260—75)

ABSTRACT OF THE DISCLOSURE

In the manufacture of highly polymeric linear polyesters of aromatic dicarboxylic acids, e.g., polyethylene terephthalate, the polymerization reaction is carried out in the presence of from 0.05% to 1% by weight, based on the weight of alkyl ester of the aromatic dicarboxylic acid employed, of an organic phosphonate selected from the group consisting of hydroxy-polyoxyethylene hydroxymethyl phosphonate, hydroxy - polyoxyethylene chloromethyl phosphonate, hydroxy-polyoxyethylene trichloromethyl phosphonate, bis[2-bromoethyl(phenyl)] ethylene diphosphonate, bis(2-bromoethyl)phosphonate, bis(2-chloroethyl)phosphonate, the reaction product of triethyl phosphite and 2-chloroethanol, the reaction product of triethyl phosphite and 2-bromoethanol, and the reaction product of dimethyl methylphosphonate and ethylene glycol. The resulting products have the advantageous properties, particularly with respect to film made therefrom, normally associated with the presence of phosphorus compounds in the polyester composition, and the disadvantages generally incident to reaction of the phosphorus compound with catalysts commonly employed in the manufacture of the polyesters are avoided.

---

This application is a continuation-in-part of our now abandoned application Ser. No. 274,903, filed Apr. 23, 1963, which in turn is a continuation-in-part of our now abandoned application Ser. No. 195,325 filed May 16, 1962.

The production of the novel class of film- and fiber-forming polyesters of terephthalic acid and a glycol of the series $HO(CH_2)_nOH$ where $n$ is an integer from 2–10, inclusive, is fully disclosed in U.S. Patent 2,465,319 to Whinfield and Dickson. From a commercial standpoint, one of the most attractive polymers of this class is polyethylene terephthalate prepared by carrying out an ester interchange between ethylene glycol and dimethyl terephthalate to form bis-2-hydroxy ethyl terephthalate monomer which is polymerized to polyethylene terephthalate under reduced pressure and at elevated temperatures, and in the presence of suitable catalysts.

In the manufacture of polyethylene terephthalate film from a polymer prepared in accordance with the general teaching of aforementioned U.S. Patent 2,465,319 it is preferred to carry out in a continuous operation the steps of (1) ester interchange between glycol and dimethyl terephthalate in the presence of an ester-interchange catalyst to form bis-2-hydroxyethyl terephthalate monomer; (2) polymerization of the monomer in the presence of a polymerization catalyst to form a high molecular weight polyethylene terephthalate; (3) melt-extrusion of the polymer into film. The operation of such a continuous process, however, is fraught with several serious difficulties. One of the most formidable difficulties encountered in this process, for example, is the formation of striations in the film. These striations seem to originate at the lips of the extrusion die from which the polymer is formed into film. The appearance of striations necessitates closing down the operation for cleaning the lips of the die. During these interruptions the polymer must be dumped resulting not only in a loss of production time but loss of material as well. Another serious difficulty is undesirable color-formation (i.e., yellowing) which appears to take place during the polymerization stage and is apparently ascribable to the polymerization catalysts. It has been found that the first of these difficulties is obviated by the addition to the reaction mixture preferably in the polymerization stage, of a small amount of ammonium phosphate or phosphite. The presence of such phosphorous material in the polymer also serves to greatly enhance the insulation resistance of the polymeric film and hence increases its value and application as a dielectric material. The addition of these phosphorus compounds, while greatly improving the insulation resistance of the film, inhibiting color-formation, and materially eliminating film striations and thereby reducing lost production time for extrusion die cleaning, has two serious drawbacks. It is commonly known that monoammonium phosphate, for example reacts with many of the catalysts, commonly employed, to form solid precipitates. This condition results in the problems of (1) more rapid plugging of the polymer filtration system and, presumably because of the conversion of the catalyst to inactive forms, (2) lower polymerization activity which limits polymer production.

These problems also arise with respect to other linear polyesters. Thus, although the invention will be described primarily as it applies to linear polymeric esters of terephthalic acid, it should be understood that the invention is also applicable to linear polymeric esters of aromatic dicarboxylic acids, in general.

It is an object of this invention, therefore, to provide an improved process of preparing linear polymeric esters and, particularly, highly polymeric linear terephthalate esters. Another object is to provide for the continuous production of shaped structures (e.g., film) therefrom which substantially avoids the aforementioned maintenance and catalyst reaction problems. A further object is to prepare polyethylene terephthalate film having enhanced insulation resistance which is particularly useful as a dielectric in capacitors, etc. A still further object is to provide polymeric esters of aromatic dicarboxylic acids and particularly polyethylene terephthalate which are substantially free of undesirable coloration. The foregoing and additional objects will be apparent from the detailed description which follows.

These objects are realized by the present invention which briefly stated, comprises in a process of making highly polymeric polyethylene terephthalate wherein an initial reaction charge selected from the group of reactants comprising (A) an alkyl ester of terephthalic acid having 1–7 carbon atoms in the alkyl group and a polymethylene glycol having from 2–10 carbon atoms and (B) bis-2-hydroxyalkyl terephthalate and low molecular weight polymers thereof having an intrinsic viscosity not greater than 0.2 is reacted in the presence of a catalyst system effective to promote (1) ester interchange and polymerization in the case of (A) and (2) polymerization in the case of (B); the improvement which comprises carrying out the polymerization until a film-forming polymer is produced in the presence of from 0.05% to 1% by weight, based on the weight of alkyl ester of terephthalic acid in the initial reaction charge, of an organic phosphonate selected from the group consisting of hydroxy-polyoxyethylene hydroxymethyl phosphonate, hydroxypolyoxyethylene chloromethyl phosphonate, hydroxy-polyoxyethylene trichloromethyl phosphonate, bis [2-bromoethyl(phenyl)]ethylene diphosphonate, bis(2-bromoethyl)phosphonate, bis(2-chloroethyl)phosphonate, the reaction product of triethyl phosphite and 2-chloroethanol, the reaction product of triethyl phosphite and 2-bromoethanol, and the reaction product of dimethyl methylphosphonate and ethylene glycol.

The invention is also applicable to a process wherein the initial reaction charge is selected from the group of reactants comprising (A) an alkyl ester of an aromatic dicarboxylic acid having 1–7 carbon atoms in the alkyl group and a polymethylene glycol having from 2–10 carbon atoms and (B) bis-hydroxyalkyl ester of an aromatic dicarboxylic acid and low molecular polymers thereof having an intrinsic viscosity not greater than 0.2; and the charge is reacted in the presence of a catalyst system effective to promote ester interchange and polymerization in the case of charge (A) and polymerization alone in the case of charge (B). Some of the more important aromatic dicarboxylic acids include

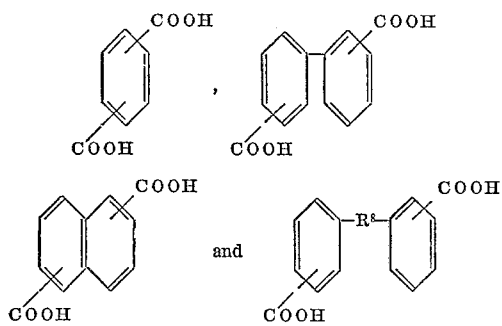

wherein $R^8$ is selected from the group consisting of an alkylene chain having 1–3 carbon atoms,

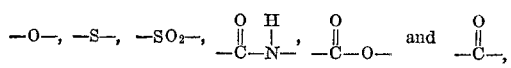

the preferred ones being terephthalic acid; isophthalic acid, bibenzoic acid; 1,5-naphthalene dicarboxylic acid; 2,6-naphthalene dicarboxylic acid; and 2,7-naphthalene dicarboxylic acid. The preferred polymethylene glycol is ethylene glycol. However, one or more (at least one) of the following may be used: ethylene glycol, diethylene glycol, propylene glycol, butylene glycol, decamethylene glycol, neopentyl glycol and trans-bis-1,4-(hydroxymethyl)cyclohexane.

The organic phosphonate may be added to the reaction mixture at any time prior to, or during polymerization, and should be present in the reaction mixture in an amount within the range of from 0.05% to 1% by weight based on the weight of the alkyl ester of the aromatic dicarboxylic acid (the dimethyl terephthalate) in the initial reaction charge. When less than 0.05% of phosphonate is used the beneficial results of our invention are not realized. On the other hand, if more than 1% of phosphonate is added to the reaction mixture, the rate of polymerization decreases, the melt viscosity of the polymer increases with respect to the intrinsic viscosity, and an undesirable gray cast is imparted to film cast from the polymer.

Typical catalyst systems utilized for the ester interchange between the alkyl ester of an aromatic dicarboxylic acid having 1–7 carbon atoms, preferably dimethyl terephthalate and a polymethylene glycol having 2–10 carbon atoms, preferably ethylene glycol, and the subsequent polymerization to the polyester, preferably polyethylene terephthalate, and which are compatible with the organic phosphonate additives of this invention, are listed in the following table:

TABLE I

| System: | Percent composition range (based on weight of DMT)[1] |
|---|---|
| Zinc acetate dihydrate | 0.01–0.05 |
| Lithium hydride | 0.003–0.015 |
| Antimony trioxide | 0.02–0.04 |
| Manganous acetate | 0.0001–0.003 |
| Antimony trioxide | 0.00005–0.003 |
| Zinc acetate dihydrate | 0.01–0.05 |
| Antimony trioxide | 0.02–0.04 |
| Zinc acetate dihydrate | 0.01–0.10 |
| Tetraisopropyl titanate | 0.0015–0.0045 |
| Zinc acetate dihydrate | 0.02–0.05 |
| Tetraisopropyl titanate | 0.0015–0.0045 |
| Zinc acetate dihydrate | 0.02–0.05 |
| Lithium hydride | 0.003–0.015 |
| Lanthanum titanate | 0.01–0.10 |
| Lanthanum oxide | 0.01–0.10 |
| Lanthanum titanate | 0.01–0.10 |
| Cerium oxide | 0.001–0.05 |
| Lithium hydride | 0.003–0.015 |
| Zinc acetate dihydrate | 0.01–0.05 |
| Cobaltous acetate | 0.01–0.05 |
| Lithium hydride | 0.003–0.015 |
| Cadmium acetate | 0.01–0.15 |
| Cobaltous acetate | 0.01–0.15 |
| Antimony trioxide | 0.01–0.10 |
| Zinc acetate dihydrate | 0.02–0.05 |
| Antimony trioxide | 0.02–0.05 |
| Magnesium acetate dihydrate | 0.003–0.01 |
| Litharge (PbO) | 0.005–0.1 |
| Antimony trioxide | 0.01–0.15 |
| Cobaltous acetate | 0.01–0.15 |
| Litharge | 0.01–0.10 |
| Cobaltous acetate | 0.01–0.15 |
| Litharge | 0.01–0.10 |
| Antimony trioxide | 0.01–0.10 |
| Calcium acetate | 0.01–0.15 |
| Antimony trioxide | 0.01–0.10 |
| Litharge | 0.005–1.0 |
| Manganous formate | 0.1–0.10 |
| Silico Tungstic acid | 0.01–0.10 |

[1] Dimethyl terephthalate.

Representative catalyst systems, compatible with phosphonate additives, utilized for polymerization of the bis-hydroxyalkyl ester of an aromatic dicarboxylic acid, preferably bis-2-hydroxyethyl terephthalate are listed in the following table:

TABLE II

| System: | Percent composition (based on wt. of DMT) |
|---|---|
| Germanium oxide | 0.001–0.05 |
| Antimony trioxide | 0.02–0.04 |
| Tetraisopropyl titanate | 0.0015–0.0045 |
| Zinc acetate dihydrate | 0.02–0.05 |
| Lithium hydride | 0.003–0.015 |
| Antimony trioxide | 0.02–0.04 |
| Lithium hydride | 0.001–0.0010 |

In the preferred embodiment of this invention polyethylene terephthalate film is produced continuously in a series of sequential continuous steps comprising reacting dimethyl terephthalate with ethylene glycol under ester-interchange conditions in the presence of an ester-interchange catalyst to form bis-2-hydroxyethyl terephthalate having an intrinsic viscosity no greater than 0.2; heating the bis-2-hydroxyethyl terephthalate at a temperature within the range of from about 230° C. to about 290° C., under a pressure of from 0.05 to 25 mm. of mercury, in the presence of a polymerization catalyst and at least 0.05% by weight, based on the weight of dimethyl terephthalate, of an organic phosphonate of the group hereinabove defined, until a film-forming polyethylene terephthalate (intrinsic viscosity of at least 0.45) is formed; extruding the molten polymer to form a self-supporting film; elongating the film at least 2.5X in at least one direction (where X is the original dimension of the film in the direction of stretch), and heating the stretched film at a temperature of 150–250° C. to produce an oriented, heat-set film. Alternatively, the polymerization of the bis-2-hydroxyethyl terephthalate may be carried out directly by employing previously synthesized bis-2-hydroxyethyl terephthalate as a chemical intermediate in flake form.

The following specific examples will serve to further illustrate the principles and practice of this invention.

EXAMPLES 1–14

Samples of polyethylene terephthalate film were prepared as follows: ethylene glycol and DMT (dimethyl terephthalate) (in the ratio of one mol of dimethyl terephthalate to two mols of ethylene glycol) were introduced along with 0.002% lithium hydride, 0.012% zinc acetate dihydrate, and 0.03% antimony trioxide (based on weight percent of dimethyl terephthalate) were introduced into a reactor fitted with stirring means. An ester-interchange reaction was carried out at atmospheric pressure and within a temperature range between 140–220° C., and methanol was continuously withdrawn from the reactor. At the end of the ester-interchange step, polymerization of bis-2-hydroxyethyl terephthalate was carried out within the temperature range betwen 230–290° C. under reduced pressure within the range from 0.05–2.5 mm. of mercury. During polymerization, glycol was continuously withdrawn from the reactor. The organic phosphonate dissolved in ethylene glycol (3% by weight of phosphorus additive) was injected into the reactor after completion of the ester-interchange reaction. The polymerization reaction was carried out until a desired intrinsic viscosity was obtained, i.e., within the range of from 0.45 to 0.65. Thereafter, the polymer was introduced into an extrusion apparatus from which molten polymer was continuously extruded into film in amorphous form. The film was then cooled to room temperature on a quench roll.

The organic phosphonate compounds added to the polymerization reaction described were: (1) bis [2-bromoethyl (phenyl)] ethylene diphosphonate (2) hydroxypolyoxyethylene hydroxy methyl phosphonate, (3) the reaction product of triethyl phosphite and 2-chloroethanol, and (5) bis (2-chloroethyl) 1-[(2-chloroethyl) 1-[(2-chloroethyl) 2-chloroethyl-phosphonate] ethylphosphonate] ethyl phosphonate.

The phosphonate compounds of (3) and (4) respectively, were prepared as follows:

Reaction between triethyl phosphite and 2-chloroethanol: Triethyl phosphite and 2-chloroethanol (one-to-one mole ratio) were heated in a reaction vessel until the reaction mixture reached a temperature of approximately 200° C. Reaction by-products (ethanol and low boiling materials) were distilled off during the heating period. Preparation was completed by vacuum distillation of the reaction residue at temperatures up to 250° C. and a pressure of 15 mm. of mercury. Combustion analysis of a representative sample of the above reaction residue gave the following results:

|  | Percent |
|---|---|
| Phosphorus | 22.98 |
| Carbon | 31.14 |
| Hydrogen | 6.42 |
| Chlorine | 4.27 |
| Oxygen | 15.19 |

The material was undistillable. This analysis indicated a compound of the following structure:

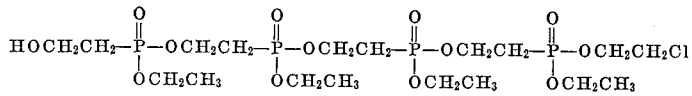

Reaction product between triethyl phosphite and 2-bromoethanol. Triethyl phosphite and 2-bromoethanol (one-to-one mole ratio) were heated in the reaction vessel until the reaction mixture reached a temperature of approximately 200° C. Reaction by-products (unidentified low-boiling materials in ethanol) were distilled off during the heating period. The preparation was completed by vacuum distillation of the reaction residue at temperatures up to 250° C. and a pressure of 15 mm. of mercury. The material was undistillable. This analysis indicated a structure of the following type:

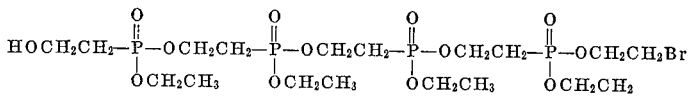

Samples of the above-prepared polyethylene terephthalate films along with polyethylene terephthalate film samples (control) prepared in a manner identical to those described hereinbefore, with the exception that the organic phosphonate component was not present or was replaced with the inorganic phosphorus compound, i.e., monoammonium phosphate, were tested for film capacitor insulation resistance expressed as average resistivity in ohm/cm.×$10^{12}$ (single sheet test) and color expressed as percent yellow per five mil sample.

The insulation resistance was measured by the single sheet test dielectric method. In electrical applications in general, the insulating material or dielectric is subjected to electrical stresses which result in current flow in the dielectric. The current flow increases as a result of decreasing resistivity at elevated temperatures. In the case of capacitors, this effect is particularly important, as the flow of current results in higher temperatures and shorter life. The resistivity of polyethylene terephthalate film dielectric is measured by constructing a capacitor, using a film as a dielectric, and connecting a capacitor into a high-resistant bridge circuit (General Radio Megohm Bridge—Type 544–B). In the single sheet test dielectric method, a single sheet of test dielectric is used, and the resistance value measured in ohms is used to calculate volume resistivity (across opposite faces of the unit cube) in terms of ohm-centimeters. The single sheet measurement is made by painting a round electrode (one inch in diameter) on each side of the specimen of known thickness. The specimen is placed between brass plates of the electrode cell which is connected to the megohm bridge; the resistance in ohms at 125° C. is used to calculate resistivity ($r$), in ohm-centimeters from the following relationship:

$$r = R \times \frac{A}{t}$$

where $r$=the resistance in ohms at 125° C.; $A$=area in cm.²; $t$=thickness in centimeters.

Measurement of the color of the film samples was made on the "color master" and corrected to 5 mil thickness.

Table III lists for each example the phosphorus additive, weight percent of additive based on dimethyl terephthalate, the average resistivity in ohm/cm.×$10^{12}$, and the percent yellow based on a 5 mil thick sample.

TABLE III.—EFFECT OF ORGANIC PHOSPHONATE DERIVATIVES ON ELECTRICAL RESISTANCE AND COLOR OF POLYETHYLENE TEREPHTHALATE FILMS

| Example Number | Additive | Wt. percent additive (based on DMT) | Avg. resistivity (ohm-cm. $\times 10^{12}$) | Percent yellow/5 mil | Average film thickness (mils) |
|---|---|---|---|---|---|
| 1 | B2BMPPE [1] | 0.11 | 6.08 | 2.20 | 4.5 |
| 2 | B2BMPPE [1] | 0.17 | 9.25 | 1.83 | 4.8 |
| 3 | B2BMPPE [1] | 0.23 | 11.47 | 1.87 | 4.0 |
| 4 | POEHMP [2] | 0.17 | 20.30 | 2.12 | 4.6 |
| 5 | POEHMP [2] | 0.23 | 21.40 | 1.87 | 5.1 |
| 6 | PP-BR [3] | 0.11 | 10.50 | 1.68 | 4.1 |
| 7 | PP-BR [3] | 0.17 | 15.50 | 1.55 | 4.5 |
| 8 | PP-BR [3] | 0.23 | 17.60 | 1.21 | 3.5 |
| 9 | PP-CL [4] | 0.06 | 11.10 | 1.99 | 4.7 |
| 10 | PP-CL [4] | 0.11 | 19.70 | 0.94 | 5.9 |
| 11 | PP-CL [4] | 0.17 | 25.80 | 0.82 | |
| 12 | PP-CL [4] | 0.23 | 35.10 | 1.22 | 9.1 |
| 13 | B2CEP [5] | 0.23 | 34.47 | 1.00 | 4.6 |
| Control | Monoammonium Phosphate | 0.08 | 7.70 | 3.39 | 4.1 |
| Do | do | 0.11 | 7.40 | | 7.0 |
| Do | None | | 1.40 | 3.95 | 4.6 |
| Do | do | | 2.90 | 2.59 | 5.0 |
| Do | do | | 3.30 | 4.81 | 4.3 |
| Do | do | | 2.70 | 5.16 | 4.7 |

[1] B2BMPPE—2-Bromoethyl (phenyl) ethyl diphosphonate.
[2] POEHMP—Hydroxy-polyoxyethylene hydroxymethyl phosphonate.
[3] PP-BR—Reaction product of triethyl phosphite and 2-bromoethanol.
[4] PP-CL—Reaction product of triethyl phosphite and 2-chloroethanol.
[5] B2CEP—Bis(2-chloroethyl)1-[(2-chloroethyl)1-[(2-chloroethyl)2-chloroethyl phosphonate] ethyl phosphonate] ethyl phosphonate.

EXAMPLES 15–16

Samples of substantially amorphous polyethylene terephthalate film were prepared in a manner similar to that described in Examples 1–14. A catalyst system comprising 0.006% lithium hydride, 0.012% zinc acetate dihydrate, and 0.03% antimony trioxide expressed in the weight percent of the weight of DMT was employed. Prior to polymerization, 0.23% (based on the weight of DMT), an organic phosphonate was added to the reaction mixture. PP-Cl (the reaction product of triethyl phosphite and 2-chloroethanol) and hydroxy-polyoxyethylene hydroxymethyl phosphonate were the additives employed. After extrusion and quenching, the films were then continuously stretched longitudinally and then transversely to substantially the same extent (3X its initial dimension) in each direction to form a substantially balanced film, i.e., physical properties being substantially the same in both directions. Finally, the films were heat set at 200° C. while held under tension. The average capacitor insulation resistance and percent yellow/5 mil sample were measured for representative film samples. The average capacitor insulation resistance was measured by assembling a wound capacitor and evaluating a dielectric in terms of megohms vs. microfarads. The wound capacitor consists of alternate single layers of polyethylene terephthalate film (2 inches width) and of aluminum 1½ inches in width. The length of the film wound into the capacitors is determined by the desired capacitance. The resistance of the wound capacitor is measured at 125° C. on a megohm bridge and then the capacitance is measured under the same conditions using a Cornell-Dubilier capacitor analyzer. The product of the two values gives a megohms × microfarads value.

The percent yellow per 5 mil sample was measured by the "color master." Table IV lists for each example the additive employed, weight percent of additive, average capacitor insulation resistance, and percent yellow per 5 mil sample. As a control example, polyethylene terephthalate film was prepared in the above-identified manner except that the organic phosphonate derivative was replaced by monoammonium phosphate.

TABLE IV.—EFFECT OF ORGANIC PHOSPHONATE DERIVATIVES ON ELECTRICAL RESISTANCE AND COLOR OF POLYETHYLENE TEREPHTHALATE FILMS

| Example Number | Additive | Wt. percent additive (based on DMT) | Avg. capacitor insulation resistance (megohms x microfarads) | Percent yellow/5 mil | Average film thickness (mils) |
|---|---|---|---|---|---|
| 15 | PP-CL [1] | 0.23 | 1,239 | 1.59 | 0.7 |
| 16 | POEHMP [2] | 0.23 | 458 | 2.01 | 0.8 |
| Control | Monoammonium phosphate | 0.09 | 330 | 3.64 | 0.7 |

[1] PPCL—Reaction product of triethyl phosphite and 2-chloroethanol.
[2] POEHMP—Polyoxyethylene hydroxymethyl phosphonate.

EXAMPLES 17–28

Samples of substantially amorphous polyethylene terephthalate film were prepared in a manner described in the previous examples. The catalyst system employed was identical with that employed hereinbefore. Prior to polymerization from 0.08–0.34% (based upon the weight of DMT) of an organic phosphonate derivative was added to the reaction mixture. Hydroxy-polyoxyethylene chloromethyl phosphonate, hydroxy-polyoxyethylene trichloromethyl phosphonate and bis(2-bromoethyl) phosphonate were the additives employed. After extrusion and quenching, the films were then stretched in the machine direction (LD) to an extent of approximately 3X. The films were heat set at 200° C. while held under tension. The average resistivity in ohms×cm. measured as described hereinbefore by the single sheet test dielectric method and the percent yellow per five mil sample was measured for these film samples. Table V lists for each example the additive employed, weight percent additive, average resistivity (ohms×cm. $10^{12}$), and percent yellow per 5 mil film sample. To serve as control example, a polyethylene terephthalate film sample was prepared identically described above with the exception that either monoammonium phosphate was substituted for the organic phosphonate, or no additive was employed.

TABLE V.—EFFECT OF ORGANIC PHOSPHONATE DERIVATIVES ON ELECTRICAL RESISTANCE AND COLOR OF POLYETHYLENE TEREPHTHALATE FILMS

| Example Number | Additive | Wt. percent additive (based on DMT) | Avg. resistivity (ohm-cm. ×$10^{12}$) | Percent yellow/ 5 mil | Average film thickness (mils) |
|---|---|---|---|---|---|
| 17 | POECMP [1] | 0.08 | 56.2 | 2.78 | 2.4 |
| 18 | POECMP [1] | 0.17 | 54.9 | 2.40 | 2.2 |
| 19 | POECMP [1] | 0.26 | 38.8 | 1.67 | 2.8 |
| 20 | POECMP [1] | 0.34 | 68.1 | 1.40 | 2.2 |
| 21 | POETCMP [2] | 0.08 | 60.1 | 2.28 | 2.4 |
| 22 | POETCMP [2] | 0.17 | 54.4 | 2.07 | 2.6 |
| 23 | POETCMP [2] | 0.26 | 62.6 | 1.34 | 2.3 |
| 24 | POETCMP [2] | 0.34 | 65.8 | 1.07 | 2.2 |
| 25 | Bis(2-bromoethyl)2-bromoethyl phosphonate. | 0.08 | 41.5 | 2.23 | 2.4 |
| 26 | do | 0.17 | 49.8 | 1.90 | 2.5 |
| 27 | do | 0.26 | 52.1 | 1.86 | 2.1 |
| 28 | do | 0.34 | 60.3 | 2.21 | 2.5 |
| Control | Monoammonium phosphate | 0.09 | 63.8 | | 2.8 |

[1] Hydroxy-polyoxyethylene chloromethylphosphonate.
[2] Hydroxy-polyoxyethylene trichloromethyl phosphonate.

EXAMPLES 29–33

Samples of substantially amorphous polyethylene terephthalate were prepared as described hereinbefore. The catalyst system employed was identical with that employed in the previous examples. Dimethyl methyl phosphonate in amounts varying between 0.14 and 0.58% (weight percent based on weight of DMT) was added with the catalysts employed, either during ester interchange reaction between the DMT and ethylene glycol, or just prior to polymerization of the monomer after being reacted with ethylene glycol in the presence of a catalyst (e.g., lithium hydride). In both cases the dimethyl methyl phosphonate was converted to a glycol-phosphonate derivative. After polymerizing, the polymer was extruded in the form of a film 5 mils thick and quenched in a manner such as described hereinbefore. Representative samples of the film were tested for capacitor insulation resistance by the single sheet method as previously described. Table VI lists each example, the additive employed, method of addition, weight percent additive, and average resistivity.

in both directions. The films were then heat-set at 200° C. while being held under tension. Representative samples of these films were tested for insulation resistance (in a manner described in Examples 15 and 16) and color. Color determinations were made using the trifluoroacetic acid (TFA) method of determination. This determination was conducted as follows: 2–2.5 grams of polymer were placed in a spofford flask to which was added distilled trifluoroacetic acid. Ten mils of trifluoroacetic acid were added per one gram of polymer. The flask was put on a shaker and was shaken at room temperature until the polymer completely dissolved (approximately one hour). The color analysis was run on a Beckmann E–U spectrophotometer. For these determinations a 10 milliliter Pyrex cell was employed. The cell was first washed out with trifluoroacetic acid. The absorbence of the polymer solution was run at an absorbence of 400 millimicrons and was compared to a blank cell filled with trifluoroacetic acid. The color was reported as the absorbence. Table VII lists for each example the film (stretched) thickness, TABLE VI.—EFFECT OF ORGANIC PHOSPHONATE DERIVATIVES ON ELECTRICAL RESISTANCE OF POLYETHYLENE TEREPHTHALATE FILMS

| Example Number | Additive | How added | Wt. percent additive (based on DMT) | Avg. resistivity (ohm-cm.×$10^{12}$) | Average film thickness |
|---|---|---|---|---|---|
| 29 | Dimethyl methyl phosphonate | Added during monomer prep | 0.14 | 11.77 | 4.3 |
| 30 | do | Exchanged with ethylene glycol and added just prior to polymerization. | 0.58 | 15.18 | 4.7 |
| 31 | do | do | 0.58 | 14.00 | 7.5 |
| 32 | do | Added during monomer prep | 0.14 | 12.35 | 5.0 |
| 33 | do | do | 0.14 | 11.40 | 5.6 |
| Control | None | | | 4.97 | 3.8 |
| Do | Monoammonium phosphate | Added to monomer | 0.09 | 10.96 | 11.2 |

EXAMPLES 34–36

Samples of substantially amorphous polyethylene terephthalate film were prepared as described hereinbefore. The catalyst system employed consisted of 0.06% lithium hydride, 0.012% zinc acetate dihydrate, and 0.03% antimony trioxide (weight percent based on the weight of DMT). Prior to polymerization 0.23% of an organic phosphonate derivative was added to the monomeric reaction mixture. Hydroxypolyoxyethylene hydroxymethyl phosphonate and the reaction product of triethyl phosphite and 2-chloroethanol were the additives employed. After extrusion and quenching, the film samples were stretched in both the LD and TD to an extent of approximately 3X additive employed, weight percent of additive employed, insulation resistance (megohms × microfarads), and color (TFA method).

TABLE VII.—EFFECT OF ORGANIC PHOSPHONATE DERIVATIVES ON ELECTRICAL RESISTANCE AND COLOR OF POLYETHYLENE TEREPHTHALATE FILMS

| Example Number | Film thickness (stretched) (mils) | Additive employed | Wt. percent additive (based on DMT) | Insulation resistance (megohms x microfarads) | Color TFA |
|---|---|---|---|---|---|
| 34 | 0.5 | POEHMP [1] | 0.23 | 557 | 0.117 |
| 35 | 0.5 | PP-CL [2] | 0.23 | 590 | 0.103 |
| 36 | 1.0 | POEHMP [1] | 0.23 | | 0.000 |
| Control | 0.5 | Monammonium phosphate | 0.09 | 429 | 0.167 |

[1] POEHMP—Hydroxy-polyoxyethylene hydroxymethyl phosphonate.
[2] PP-CL—Reaction product of triethyl phosphite and 2-chloroethanol.

EXAMPLES 37–39

Samples of substantially amorphous polyethylene terephthalate film were prepared by the direct polymerization of bis(beta-hydroxyethyl)terephthalate. The procedure was as follows: bis(beta-hydroxyethyl)terephthalate (DHET), the preparation of which is well known to the art, in the form of flake, was melted in a reaction vessel at 140° C. Tetraisopropyl titanate in the concentration of one to two parts per million titanium based on the weight of reactants was employed as the catalyst and was added directly to the DHET reaction vessel. Also added directly to the reaction ingredients was 0.146% hydroxy-polyoxyethylene hydroxymethyl phosphonate. The weight percent of the organic phosphonate was based on the weight of dimethyl terephthalate as the starting monomer. The reaction mass was heated to 140° C. to melt the monomer and catalyst. Excess ethylene glycol was distilled off by heating the reaction mixture to 230° C. for a period of 40 minutes. Polymerization of DHET to polyethylene terephthalate was then accomplished by heating the mixture by placing the reaction vessel in vapors of boiling dimethyl phthalate at a temperature of 282° C. and a pressure of 0.5–0.1 mm. of mercury for a period of two hours. The thus formed molten polymer was extruded in the form of a film and quenched on a quench roll maintained at a temperature of 70–80° C. Samples of the extruded and quenched film were stretched 3X in both the LD and TD and heat-set at 200° C. while being held under tension. Tests were run on these test films for capacitor insulation resistance, utilizing the single sheet method, and color, utilizing the TFA test. As control examples, DHET was polymerized in the same manner as described above with the exception that either monoammonium phosphate was substituted for the organic phosphonate derivative or no phosphorus derivative was employed. In the case wherein monoammonium phosphate was employed, a catalyst system comprising 0.03% antimony trioxide (percent catalyst being based on the weight of DMT). Table VIII lists for each example the thickness of both the cast and stretched film, catalyst system employed, phosphorus derivative employed, average resistivity (in ohms-cm. $\times 10^{12}$)

and the color as measured by the TFA test.

and feed nozzles being plugged by precipitated reaction products.

EXAMPLE 40

Monomeric ethylene naphthalene 2,6 dicarboxylate was prepared by carrying out an ester-interchange reaction in a conventional manner between ethylene glycol and dimethyl naphthalene 2,6 dicarboxylate utilizing a catalyst system comprising manganous acetate $$(Mn(OAc)_2 \cdot 4H_2O)$$

and antimony trioxide $(Sb_2O_3)$.

Three separate polymers were prepared from the above-described monomer. All contained the same catalyst, but the first (Example 40) contained an organic phosphonate, the second an inorganic phosphate (ammonium dihydrogen phosphate), and the third had no additional additive. The formulations were as follows:

| Example 40: | G. |
|---|---|
| Ethylene naphthalene 2,6 dicarboxylate monomer | 600 |
| Hydroxy - polyoxyethylene hydroxymethyl phosphonate | 0.88 |
| Zinc acetate dihydrate | 0.07 |
| Antimony trioxide | 0.028 |
| Lithium hydride | 0.019 |
| Control A: | |
| Ethylene naphthalene 2,6 dicarboxylate monomer | 600 |
| Ammonium dihydrogen phosphate | 0.83 |
| Zinc acetate dihydrate | 0.07 |
| Antimony trioxide | 0.028 |
| Lithium hydride | 0.019 |

TABLE VIII.—EFFECT OF ORGANIC PHOSPHONATE DERIVATIVES ON ELECTRICAL RESISTANCE AND COLOR OF POLYETHYLENE TEREPHTHALATE FILMS

| Example Number | Thickness mils (cast) | Thickness mils (stretched) | Catalyst system | Additive employed (Based on percent DMT) | Wt. percent additive (based on DMT as starting monomer) | Avg. resistivity (ohm-cm. 10¹²) stretched film | Color (TFA) |
|---|---|---|---|---|---|---|---|
| 37 | 12.0 | 1.35 | Tetraisopropyl titanate | Hydroxypolyoxyethylene phosphonate. | 0.146 | 81 | .062 |
| 38 | 12.0 | 1.23 | ----do---- | ----do---- | 0.146 | 97 | .062 |
| 39 | 12.5 | 1.45 | ----do---- | ----do---- | 0.146 | 80 | .070 |
| Control | 10.0 | 1.30 | $Sb_2O_3$ | Monoammonium phosphate | 0.09 | 76 | .167 |

As can be seen from the data set forth in the foregoing examples, the inclusion of the organic phosphonate derivatives, as an additive in the step of polymerizing bis(beta-hydroxyethyl)terephthalate to polyethylene terephthalate, in accordance with the present invention, results in the following advantages:

(1) *Less inhibiting action on monomer polymerization.*—Because the organic phosphonates do not significantly deactivate the catalyst normally employed in the polymerization system, economically feasible rates of polymerization are now possible and the full spectrum of catalysts available for the polymerization of polyethylene terephthalate may be employed without the danger of significant deactivation.

(2) *Significant improvement in polymer color.*—One major cause of film rejects by the consumer has been the yellowness of films (due at least in part to the phosphorus additives employed). The use of the subject organic phosphonate derivatives in polyethylene terephthalate polymerization system will materially reduce the yellowness of finished films and henceforth result in a significant economic gain.

(3) *Higher film capacitor insulation resistance.*—This improvement in insulation resistance will enable capacitors utilizing polyethylene terephthalate film as dielectric to operate for longer durations without breakdown, particularly at elevated temperatures.

(4) *Less precipitation from reaction with other process catalysts and additives.*—The absence of reaction with other catalytic agents results in less time lost due to operation shutdowns heretofore required because of filters Control B:

| Ethylene naphthalene 2,6 dicarboxylate monomer | 600 |
|---|---|
| Zinc acetate dihydrate | 0.07 |
| Antimony trioxide | 0.028 |
| Lithium hydride | 0.019 |

The polymerization reactions were carried out at a temperature of 285–290° C. under reduced pressure within the range from 0.05–2.5 mm. of mercury. The polymerization reaction was carried out until the desired intrinsic viscosity was obtained. It was observed that polymer containing the phosphonate (polymeric) had less color after polymerization than the other two polymers. Thereafter, the polymers were extruded into the form of a film and quenched. The films were then molecularly oriented by stretching in a manner described hereinbefore to an extent of 4X in both the longitudinal and transverse directions. The films were heat-set at a temperature of 220–240° C.

The hydrolytic stability of the films prepared from the three polymer batches was tested as follows. A series of small beakers filled with water were placed on the bottom of one gallon rectangular cans from which the tops had been removed. Samples of the films prepared from the three polymeric formulations described above were suspended in the can above the beakers of water. Aluminum foil was placed over the can and the can was placed in an oven at 80° C. Periodically the film samples were removed and tested for brittleness by manually flexing the film in a rapid manner. After flexing, the film samples were scrutinized for evidence of cracking. These hydrolytic stability tests showed that films from Example 40 (containing the organophosphonate) were still flexible after 345 days in the 100% R.H. atmosphere at 80° C. Control A (containing the inorganic phosphate) failed after 75 days. The polymeric film to which no phosphorous additive had been added (Control B) failed after 110 days. When samples of the oriented film from the three polymer compositions were subjected in an oven at a temperature of 200° C. for a prolonged period, it was found that the Control B films failed due to oxidative degradation after 137 hours, the Control A films failed after 145 hours, and those of the example failed after 300 hours. Thus, greater than two-fold improvement was realized for the film prepared according to this invention.

Similar improvements in hydrolytic stability were observed for films of polyethylene terephthalate prepared using the organic phosphonate catalyst.

EXAMPLE 41

Two separate ester-interchange reactions were carried out in a conventional manner between ethylene glycol and a mixture of dimethyl bibenzoate and dimethyl 4,4'-isopropylidene dibenzoate. In one case, an organic phosphonate (hydroxy-polyoxyethylene hydroxymethyl phosphonate) was included in the reaction and in the other, the control, no phosphonate was added. The formulations for the preparation of monomer were as follows:

Example 41: G.
- Dimethyl bibenzoate _____ 432
- Dimethyl 4,4'-isopropylidene bibenzoate____ 124
- Ethylene glycol _____ 273
- Mn(OAc)$_2$·4H$_2$O _____ 0.1962
- Sb$_2$O$_3$ _____ 0.1164
- Hydroxy - polyoxyethylene hydroxymethyl phosphonate (added in 1.5 ml. ethylene glycol) _____ 0.17

Control:
- Dimethyl bibenzoate (1.6 moles) _____ 432
- Dimethyl 4,4'-isopropylidene bibenzoate (0.4 mole) _____ 124
- Ethylene glycol (4.4 moles) _____ 273
- Mn(OAc)$_2$·4H$_2$O _____ 0.1962
- Sb$_2$O$_3$ _____ 0.1164

After the ester-interchange reaction was complete, the two monomers were polymerized by conventional methods. The polymer obtained from the control (phosphonate free) was strongly colored. The polymer of Example 41 (phosphonate containing) was very lightly colored.

We claim:

1. In the process of producing polyethylene terephthalate wherein dimethyl terephthalate is reacted with ethylene glycol in the presence of an ester interchange catalyst to effect ester interchange with the formation of bis - 2 - hydroxyethyl terephthalate and the bis - 2 - hydroxyethyl terephthalate is subsequently polymerized to form film-forming polyethylene terephthalate in the presence of a catalyst effective to promote polymerization, the improvement which comprises polymerizing said bis-2-hydroxyethyl terephthalate in the presence of from 0.05% to 1% by weight of an organic phosphonate selected from the group consisting of the organic phosphonate resulting from the reaction between triethyl phosphite and 2-chloroethanol and having the formula

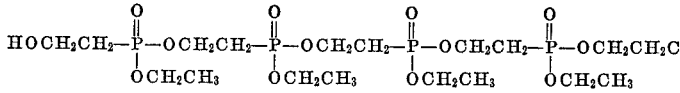

the organic phosphonate resulting from the reaction between triethyl phosphite and 2-bromoethanol and having the formula

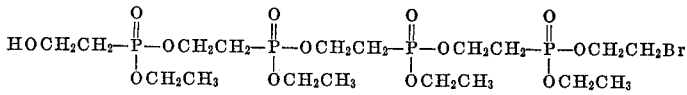

and the organic phosphonate resulting from the ester-interchange reaction between dimethyl methylphosphonate and ethylene glycol.

2. The process of claim 1 wherein the organic phosphonate is the organic phosphonate resulting from the reaction between triethyl phosphite and 2-chloroethanol and having the formula

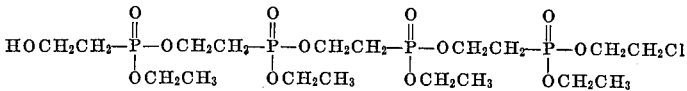

3. The process of claim 1 wherein the organic phosphonate is the organic phosphonate resulting from the reaction between triethyl phosphite and 2-bromoethanol and having the formula

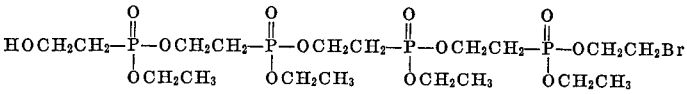

4. The process of claim 1 wherein the organic phosphonate is the organic phosphonate resulting from the ester interchange reaction between dimethyl methylphosphonate and ethylene glycol.

References Cited

UNITED STATES PATENTS

| 2,877,204 | 3/1959 | Duhnkrack et al. | |
| 3,052,653 | 9/1962 | Iannicelli | 260—75 |
| 3,058,935 | 10/1962 | Starck et al. | 260—75 |
| 3,139,450 | 6/1964 | Friedman | 260—75 |
| 3,257,337 | 6/1966 | Schoepfle et al. | 260—75 |

FOREIGN PATENTS

| 1,377,064 | 9/1964 | France. |
| 883,754 | 12/1961 | Great Britain. |
| 601,309 | 7/1960 | Canada. |
| 601,310 | 7/1960 | Canada. |
| 568,816 | 12/1958 | Belgium. |
| 1,016,511 | 1/1966 | Great Britain. |
| 1,341,506 | 9/1963 | France. |

OTHER REFERENCES

Gefter: Organophorus Monomers and Polymers, pp. IX–XV, published 1962 by Associated Technical Services Inc., Glen Ridge, N.J., QD 412–P1 G4.

Kosolapoff: Organophosphorus Compounds, p. 4, John Wiley & Sons, Inc., N.Y., 1950, QD412PIKS.

WILLIAM H. SHORT, *Primary Examiner.*

LOUISE P. QUAST, *Assistant Examiner.*